(12) United States Patent
Niimi

(10) Patent No.: US 8,307,726 B2
(45) Date of Patent: Nov. 13, 2012

(54) STARTER WITH COMPACT STRUCTURE

(75) Inventor: Masami Niimi, Handa (JP)

(73) Assignee: Denso Corporation, Kariya (JP)

( * ) Notice: Subject to any disclaimer, the term of this patent is extended or adjusted under 35 U.S.C. 154(b) by 639 days.

(21) Appl. No.: 12/320,100

(22) Filed: Jan. 16, 2009

(65) Prior Publication Data

US 2009/0183595 A1    Jul. 23, 2009

(30) Foreign Application Priority Data

Jan. 18, 2008 (JP) .................................. 2008-009004
Dec. 10, 2008 (JP) .................................. 2008-314622

(51) Int. Cl.
*F02N 15/00* (2006.01)
*F02N 15/04* (2006.01)
*F02N 15/06* (2006.01)
*F02N 15/02* (2006.01)

(52) U.S. Cl. ........................................................ 74/7 A

(58) Field of Classification Search ............... 74/6, 7 A, 74/7 R, 7 C; 335/126

See application file for complete search history.

(56) References Cited

U.S. PATENT DOCUMENTS

| | | | |
|---|---|---|---|
| 4,156,220 A | 5/1979 | Mazzorana | |
| 5,016,484 A * | 5/1991 | Morikane | ............................ 74/6 |
| 5,126,583 A * | 6/1992 | Isozumi et al. | .................. 290/48 |
| 5,677,656 A | 10/1997 | Mauch et al. | |
| 5,892,422 A * | 4/1999 | Montaigu et al. | ............. 335/126 |
| 6,776,273 B2 * | 8/2004 | Kajino et al. | ............... 192/12 B |
| 2002/0053961 A1 | 5/2002 | Kajino | |
| 2002/0067231 A1 * | 6/2002 | Kurasawa et al. | ............ 335/126 |
| 2002/0145494 A1 | 10/2002 | Andoh et al. | |
| 2006/0135002 A1 | 6/2006 | Imanishi et al. | |
| 2007/0171583 A1 | 7/2007 | Talon et al. | |
| 2009/0002105 A1 | 1/2009 | Bradfield et al. | |

FOREIGN PATENT DOCUMENTS

| | | |
|---|---|---|
| DE | 10 2004 032 373 A1 | 1/2006 |
| EP | 1 203 884 A2 | 5/2002 |
| JP | Y2-56-042437 | 10/1981 |
| JP | U-57-040240 | 3/1982 |
| JP | U-61-007839 | 1/1986 |
| JP | U-61-8933 | 1/1986 |
| JP | U-01-080744 | 11/1987 |

(Continued)

OTHER PUBLICATIONS

Japanese Office Action issued in Japanese Patent Application No. 2010-147279 dated Aug. 17, 2010 (with transation).

(Continued)

*Primary Examiner* — Justin Krause
(74) *Attorney, Agent, or Firm* — Oliff & Berridge, PLC

(57) ABSTRACT

An electromagnetic switch is disclosed as having an electromagnetic switch, operative to open or close a main contact of a motor circuit, and a solenoid having a function to push a pinion gear to a position away from a motor. The electromagnetic switch and the solenoid are placed in series in a unitary structure such that the electromagnetic switch and the solenoid have a switch case and a solenoid case both of which are integrally formed with each other to be contiguous in an axial direction.

Further, a stationary core for the electromagnet and a stationary core for the solenoid are integrally formed and an operational direction of a plunger for the electromagnet and an operational direction of a plunger for the solenoid are set to be opposite in direction.

14 Claims, 5 Drawing Sheets

FOREIGN PATENT DOCUMENTS

| | | |
|---|---|---|
| JP | A-07-253072 | 10/1995 |
| JP | A-08-504913 | 5/1996 |
| JP | A-2001-35336 | 2/2001 |
| JP | A-2002-138931 | 5/2002 |
| JP | A-2002-168166 | 6/2002 |
| JP | A-2002-313205 | 10/2002 |
| JP | A-2003-83212 | 3/2003 |
| JP | A-2004-187365 | 7/2004 |
| JP | A-2006-179201 | 7/2006 |
| JP | A-2007-165022 | 6/2007 |
| WO | WO 03/006824 A1 | 1/2003 |

OTHER PUBLICATIONS

Extended European Search Report issued in European Application No. 09000110.8 dated May 30, 2011.

* cited by examiner

STARTER WITH COMPACT STRUCTURE

CROSS REFERENCE TO RELATED APPLICATIONS

This application is based on Japanese Patent Application Nos. 2008-9004 and 2008-314622, filed on Jan. 18, 2008 and Dec. 10, 2008, respectively, the contents of which are hereby incorporated by reference.

BACKGROUND OF THE INVENTION

1. Technical Field of the Invention

The present invention relates to starters and, more particularly, to a starter having an electromagnetic switch, operative to open or close a main contact of a motor circuit, and a solenoid for pushing a pinion gear toward a ring gear of an engine.

2. Description of the Related Art

In the related art, there has been known an engine starter device of a structure disclosed in Utility Model Publication No. 56-42437 (Patent Publication 1). With such a structure, the engine starter device is comprised of an electromagnetic switch operative to open or close a main contact of a motor circuit, electromagnetic force means (an electromagnet device) having a function to push a pinion gear toward an engine via a lever, and a detector for detecting a meshing condition between the pinion and a ring gear. The electromagnetic force means acts to push the pinion gear toward the engine to be brought into meshing engagement with the ring gear. When this takes place, the detector device detects the presence of the meshing engagement between the pinion gear and the ring gear, thereby causing the electromagnetic switch to be actuated for closing the main contact. As a result, a rotational force of a motor is delivered from the pinion gear to the ring gear, thereby starting up the engine.

Meanwhile, a starter for an automotive vehicle is usually installed in a space of an area closely spaced from a side of the engine. In many cases, the engine has functional component parts like an air intake pipe with an increasing priority for engine performance. Therefore, it is likely that the starter, having only a startup function, is required to be as small as possible. In order to ensure a market competitiveness of a product per se, it is of increasing importance for the starter to be small in size with a resultant increase in installation capability.

Meanwhile, with a view to improving fuel consumption caused by an important issue of global warming, it is predicted that an idling stop function is widely used in a future. If the idling stop function is employed, the engine is started up with an increased startup frequency, a need arises for the starter to have increased durability. More particularly, main concerns include life of brushes used for a starter motor and increases in durability of the pinion gear and the ring gear.

Increasing developments have been made on brushes of the motor with a focus on materials to provide brushes having long life. The pinion gear and the ring gear mesh with each other on the premise that the meshing is established under an unlubricated condition. This results in a need for material improvement to be made. In addition, improvement needs to be made on a way of meshing engagement per se under a lessened effect of material improvement. To improve the way of meshing engagement per se, it is effective for the pinion gear to be pushed in operation and the motor to be turned on at appropriate timing. In this respect, a known technology, disclosed in Patent Publication 1, is considered to provide an effective result.

With the known technology disclosed in Patent Publication 1, however, the electromagnetic switch, operative to open or close the main contact of the motor circuit, and the electromagnetic force means, operative to push the pinion gear toward the engine, are formed in separate bodies and placed in areas around a circumferential periphery of the motor in parallel to each other. Such a structure causes an increase in dimension of the starter in two directions on a radial direction with respect to a center axis of the motor. This results in a remarkable disadvantage with an increased installation space in dimension of the engine. That is, with a commonly used starter having a single electromagnetic switch with respect to a single motor, there is a need to avoid the occurrence of an interference with the other component parts installed on the engine at a circumferential periphery thereof. A solution to this need is to move the electromagnetic switch on the motor along a circumferential direction thereof at an appropriate angle with respect to a center axis of the motor.

With the starter disclosed in Patent Publication 1, however, the motor carries thereon the electromagnetic switch and the electromagnetic force means in areas parallel to each other and, hence, it is considered that it is often difficult to avoid the interference with the other installed component part in the two directions on the radial direction.

SUMMARY OF THE INVENTION

The present invention has been completed with a view to addressing the above issues and has an object to provide a starter which includes an electromagnetic switch, operative to open or close a main contact of a motor circuit, and a solenoid, having a function to push a pinion gear toward an engine, which can minimize a dimensional limitation.

(First Aspect of the Invention)

To achieve the above object, the present invention provides a starter comprising: a motor operative to generate a rotational force; an output shaft operative to rotate upon receipt of the rotational force of the motor; a pinion gear slidably disposed on the output shaft to be axially movable; an electromagnetic switch having a switch coil forming a first electromagnet to generate a first attraction force when turned on for closing a main contact disposed in a motor energizing circuit of the motor; a solenoid having an excitation coil forming a second electromagnet to generate a second attraction force when turned on for moving the pinion gear toward a ring gear of an engine; and a unitary structure supporting the electromagnetic switch and the solenoid in series on a coaxial relationship.

With such a structure of the starter, the electromagnetic switch and the solenoid are placed in series on the coaxial relationship, resulting in a lower projected area in an axial direction than that achieved when both of these component parts are placed in parallel to each other around a circumferential direction of the starter. This enables the starter to be installed in a minimized space with almost no difference from that achieved when causing a single electromagnetic switch to have a function to open or close the main contact of the motor circuit and a function to push out the pinion gear.

Further, the starter has no need to alter positional relationships of other component parts, except for the electromagnetic switch and the solenoid, such as, for instance, a shift lever, a clutch and an output shaft or the like. Therefore, the electromagnetic switch and the solenoid can be installed on the same starter as that on which the related art electromagnetic switch is installed.

(Second Aspect of the Invention)

With the starter of the present invention, the electromagnetic switch and the solenoid may preferably include a switch case, forming a part of a first magnetic circuit of the switch coil at an outer circumferential periphery thereof, and a solenoid case, forming a part of a second magnetic circuit of the excitation coil at an outer circumferential periphery thereof, the switch case and the solenoid case being unitarily formed to be contiguous with each other in an axial direction.

In this case, no special component part is needed for the electromagnetic switch and the solenoid to be coupled in the axial direction, enabling a reduction in the number of component parts and the number of processing. In addition, this allows the switch case and the solenoid case to be unitized in structure, enabling increased resistance to vibration exerted from the outside to be obtained.

(Third Aspect of the Invention)

With the starter of the present embodiment, the switch coil of the electromagnetic switch may preferably have an outer diameter smaller than that of the excitation coil of the solenoid.

It is convenient for the wiring layout to allow lead wires of the excitation coil of the solenoid to be extracted to an area near the electromagnetic switch at which contacts are provided for turning on an electric motor. When this takes place, causing the outer diameter of the switch coil to be formed in a structure to be smaller than an outer diameter of the excitation coil enables the lead wires of the excitation coil to be located in an area outside an outer circumferential periphery of the switch coil to be extracted in an axial direction. This makes it possible to achieve a miniaturization in structure with no need to change the outer diameter of the solenoid in a large size.

(Fourth Aspect of the Invention)

With the starter of the present invention, the switch case and the solenoid case may preferably take the form of a double-layer structure including an inner yoke, placed in a radially inward area, and an outer yoke placed in a radially outward area; wherein the inner yoke has a cylindrical configuration with both ends being opened, and the outer yoke has a bottomed cylindrical configuration with one end formed in an annular bottom wall.

With such a structure, the outer yoke and the inner yoke have wall thicknesses that can be altered in a suitable relationship. With the outer yoke determined to have an appropriate wall thickness depending on a length of the outer yoke, therefore, the outer yoke can be easily formed by press-drawing work with an overall length to diameter selected in an increasing ratio, enabling a reduction in processing cost.

Further, the inner yoke takes the form of the cylindrical configuration with the both ends being opened, resulting in an effect of easily altering the wall thickness. In addition, the wall thickness of the inner yoke can be adjusted to allow the magnetic circuit to have a cross-sectional area determined at an appropriate value. As a result, an appropriate magnetic circuit can be structured at low cost.

(Fifth Aspect of the Invention)

With the present invention, the starter may further preferably comprise a stationary plate interposed between the switch coil and the excitation coil to form the parts of the magnetic circuits while holding a stationary core. The inner yoke includes a plurality of cut-and-bent segments, radially depressed inward at a position closer to the switch coil than the stationary plate and serving as positioning means, which have distal ends facing the stationary plate such that the distal ends of the cut-and-bent segments are held in abutting engagement with the stationary plate at an outer circumferential corner portion thereof to allow the stationary plate to be axially positioned. The outer yoke includes a plurality of convexed portions, formed at the same axial positions at which the cut-and-bent segments are formed on the inner yoke, which protrude radially inward to be brought into abutting engagement with outer-diametric sloped surfaces of the cut-and-bent segments, respectively.

With such a structure, the positioning means (cut-and-bent segments), formed on the inner yoke, allows the stationary plate to be positioned in the axial direction. Thus, the stationary core, retained with the stationary plate, can be located at an appropriate position without causing the position of the stationary core, retained with the stationary plate, from being dislocated in the axial direction.

Further, when the positioning means can be formed on the inner yoke for fixing the stationary plate, no cold forging is needed and the inner yoke can be easily subjected to cutting-and-raising work to form the cut-and-bent segments as the positioning means at low cost. Moreover, the outer yoke is formed with the convexed portions held in abutting engagement with the outer-diameter sloped portions of the cut-and-bent segments. This prevents the cut-and-bent segments from warping (restoring) to outer-diametric sides, thereby enabling the stationary plate to be reliably positioned in a fixed place without causing the stationary plate from escaping.

Furthermore, the outer yoke is overlapped on the inner yoke at the outer periphery thereof. Therefore, even if the inner yoke is formed with the cut-and-bent segments, no water intrudes from clearances adjacent to the cut-and-bent segments with waterproofing property being ensured.

(Sixth Aspect of the Invention)

With the starter of the present invention, the electromagnetic switch and the solenoid may preferably include stationary cores, magnetized with the first and second electromagnets, respectively, and movable cores placed in opposition to the stationary core; and the stationary core for the electromagnetic switch and the stationary core for the solenoid being unitarily formed with each other to allow the movable core for the electromagnetic switch to be attracted in one operational direction and the movable core for the solenoid to be attracted to the stationary core in the other operational direction opposite to the one operational direction.

With such a structure, the stationary core for the electromagnetic switch and the stationary core for the solenoid are formed integrally with each other, enabling the starter to have less axial dimension than that achieved when both of the stationary cores are separately provided. This makes it possible to decrease an overall length of the electromagnetic switch and the solenoid to a minimal value even if these component parts are axially disposed in series. Thus, the electromagnetic switch and the solenoid can be installed on the starter with no problem like that encountered in the electromagnetic switch of the related art. In addition, the starter can be installed on an engine at a position with almost no difference from that in which the starter of the related art is installed, enabling reductions in vehicle cost and design cost.

(Seventh Aspect of the Invention)

With the starter of the present embodiment, the pinion gear may be preferably disposed on the output shaft unitarily with a clutch held in helical spline engagement with an outer circumferential periphery of the output shaft; and the starter may further preferably comprise a shift lever. The solenoid has a function to drive the shift lever with the use of the attraction force of the excitation coil of the solenoid to push the pinion gear together with the clutch to the ring gear of the engine.

DETAILED DESCRIPTION OF PREFERRED EMBODIMENTS

Now, a starter of an embodiment according to the present invention will be described below in detail with reference to the accompanying drawings. However, the present invention is construed not to be limited to such embodiments described below and technical concepts of the present invention may be implemented in combination with other known technologies or the other technology having functions equivalent to such known technologies.

The starter 1 of the embodiment according to the present invention will be described below in detail with reference to FIGS. 1 and 2 of the accompanying drawings.

Embodiment

Figure 1:
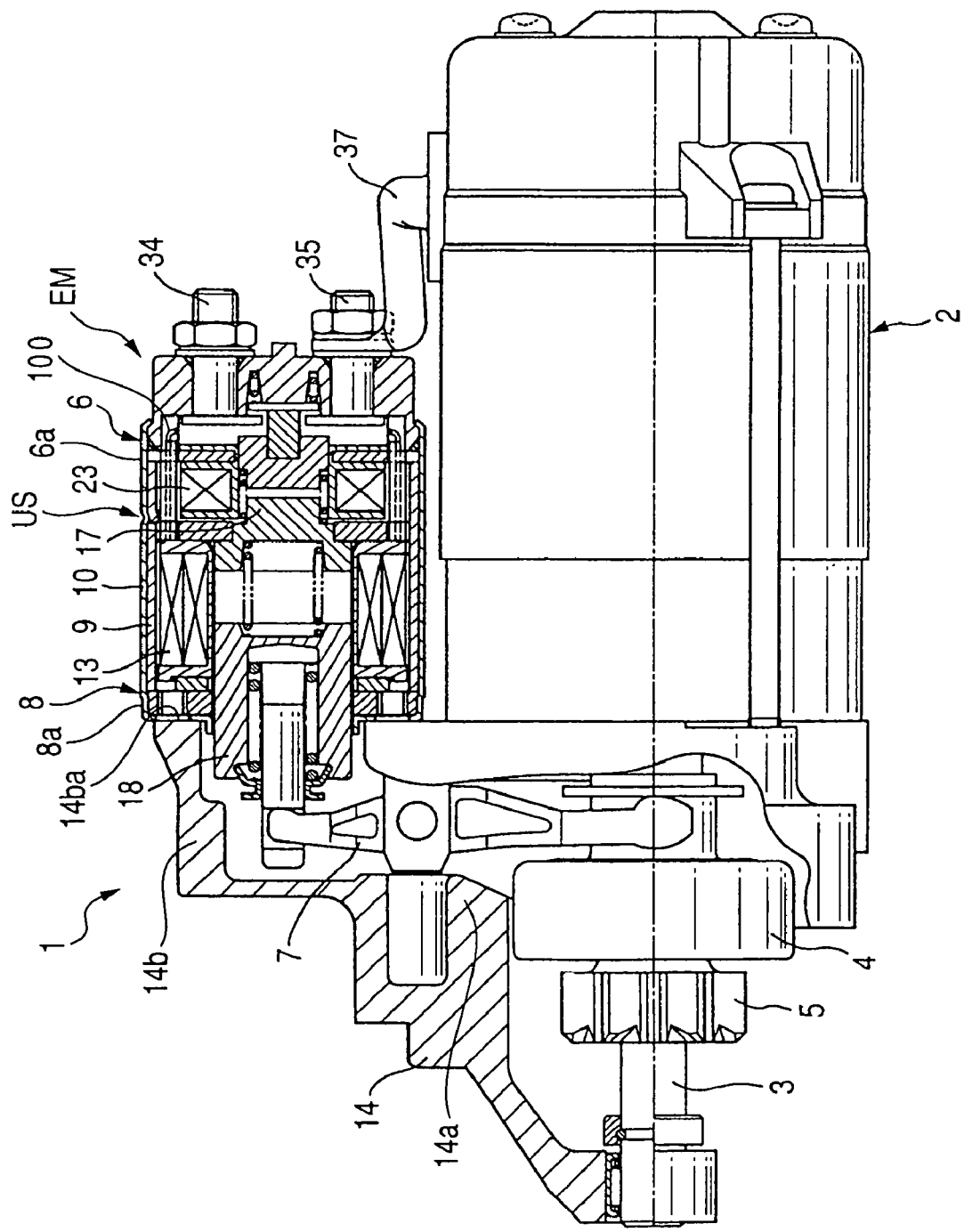
FIG. 1 is a cross sectional view showing an overall structure of a starter of an embodiment according to the present invention.

FIG. 1 is an overall structural view showing the starter of the present embodiment implementing the present invention. FIG. 2 is a cross-sectional view of an electromagnetic switch and a solenoid installed on the starter 1.

As shown in FIG. 1, the starter 1 includes a motor 2 having an armature 2a (see FIG. 7) for generating a rotational force, an output shaft 3 rotatably driven with the motor 2, a pinion gear 5 slidably disposed on the output shaft 3 to be movable unitarily with a clutch 4, an electromagnetic switch 6 operative to open or close a main contact (described below) provided in an energization circuit (hereinafter referred to as "a motor circuit"), and a solenoid 8 having a function to push the pinion gear 5 via a shift lever 7 in a position (leftward as viewed in FIG. 1) opposite to the motor 2. The starter 1 further includes a starter housing 14 having a first mounting area 14a, on which the motor 2 is axially mounted, and a second mounting area 14b on which a unitary structure US is mounted to support the electromagnetic switch 6 and the solenoid 8 in series in a coaxial relationship.

As used herein, with the present embodiment, the terms "the electromagnetic switch 6 and the solenoid 8" collectively refer to an "electromagnetic switch device EM". The other components parts (such as the motor 2, the output shaft 3, the clutch 4, the pinion gear 5 and the shift lever 7 or the like) of the starter 1, except for the electromagnetic switch device EM, have the same structures and operations as those of a starter of the related art which employs a single electromagnetic switch having a function of opening or closing a main contact and a function to push the pinion gear 5.

The electromagnetic switch device EM has a structure, which will be described below in detail with reference to FIGS. 2 to 7.

In the following description, right and left sides of the electromagnetic switch device EM, shown in FIG. 2, will be referred to as an "axially facing motor side" and an "axially facing pinion side", respectively.

The electromagnetic switch device EM includes a solenoid case 8a and a switch case 6a both of which axially extend in a continuous manner to be unitarily formed into a common cylindrical casing axially extending from the second mounting area 14b of the starter housing 14. The both of these cases 8a and 6a double as yokes forming parts of magnetic circuits. The yokes take the form of a double-layer structure composed of a common inner yoke 9 placed radially inward, and a common outer yoke 10 placed radially outward.

The inner yoke 9 is formed in a hollow cylindrical shape with both ends being opened. In addition, the inner yoke 9 has a greater wall thickness than that of the outer yoke 10. The inner yoke 9 may be of the type like a cylindrical body, having a seamless outer circumferential periphery, or a cylindrical body (such as, for instance, a structure in which a rectangular iron plate is rounded into a cylindrical structure) having an outer circumferential periphery on which a seam is formed.

The outer yoke 10 has a bottomed cylindrical configuration formed with an annular bottom wall 10a formed at the axially facing pinion side by, for instance, a press-drawing process.

The outer yoke 10 internally accommodates therein an annular member 11, made of soft magnetic material and held in abutting contact with the bottom wall 10a of the outer yoke 10. An excitation coil 13 of the solenoid 8 is located on the annular member 11 on the axially facing motor side via a resilient member 12 made of rubber or the like.

The annular member 11 has a radiated outer circumferential portion interposed between the bottom wall 10a of the outer yoke 10 and an axial end face 9a placed at the axially facing pinion side thereof, thereby forming a part of the magnetic circuit. Further, the annular member 11 has a plurality of female threaded portions 11a formed at circumferentially spaced positions to allow bolts (not shown) to be screwed to fixedly support the electromagnetic switch device EM onto a radial mounting wall 14ba of the second mounting area 14b of the starter housing 14 (see FIG. 1).

The resilient member 12 has a function to urge the excitation coil 13 against a stationary plate 15 (described below in detail) to prevent the excitation coil 13 from axially moving due to vibrations applied from external sources.

The excitation coil 13 is comprised of two coils (i.e., an attracting coil 13a and a retaining coil 13b), which are wound on a bobbin 16, made of resin, in a two-layer structure.

Figure 3:
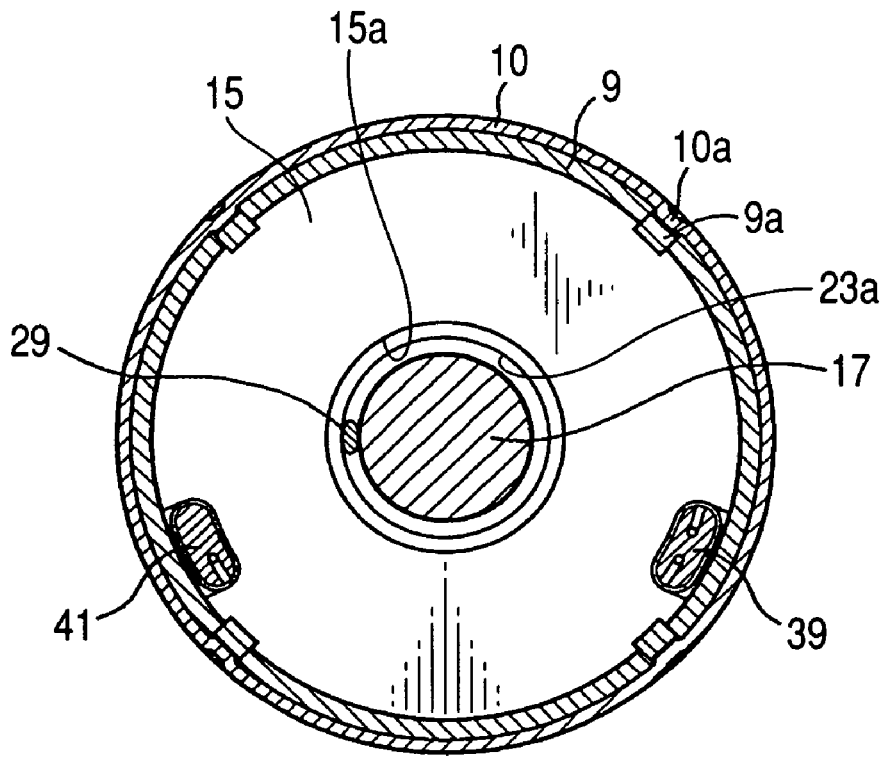
FIG. 3 is a cross section taken on line A-A of the electromagnetic switch device shown in FIG. 2.

The stationary plate 15 is placed on the excitation coil 13 on the axially-facing motor side thereof in abutting contact with a plurality (with four pieces in the illustrated embodiment) of cut-and-bent segments 9a formed on the inner yoke 9 at circumferentially spaced positions so as to protrude radially inward, as shown in FIG. 3, such that the stationary plate 15 is axially positioned in a fixed place. The stationary plate 15 is formed in an annular shape with a central area formed with a circular hole 15a to which one end of a stationary core 17 is fixed. The stationary core 17 is commonly used for the solenoid 8 and the electromagnetic switch 6.

The cut-and-bent segments 9a of the inner yoke 9 are formed on a plane closer to the axially facing motor side than a position at which the stationary plate 15 is located. This allows distal ends of the cut-and-bent segments 9a to face the stationary plate 15. With such a structure of the inner yoke 9, the distal ends of the cut-and-bent segments 9a are held in abutting engagement with the stationary plate 15 at an outer circumferential corner portion to be positioned in place so as to prevent the stationary plate 15 from moving in an axial direction on the axially-facing motor side (see FIG. 2).

Figure 2:
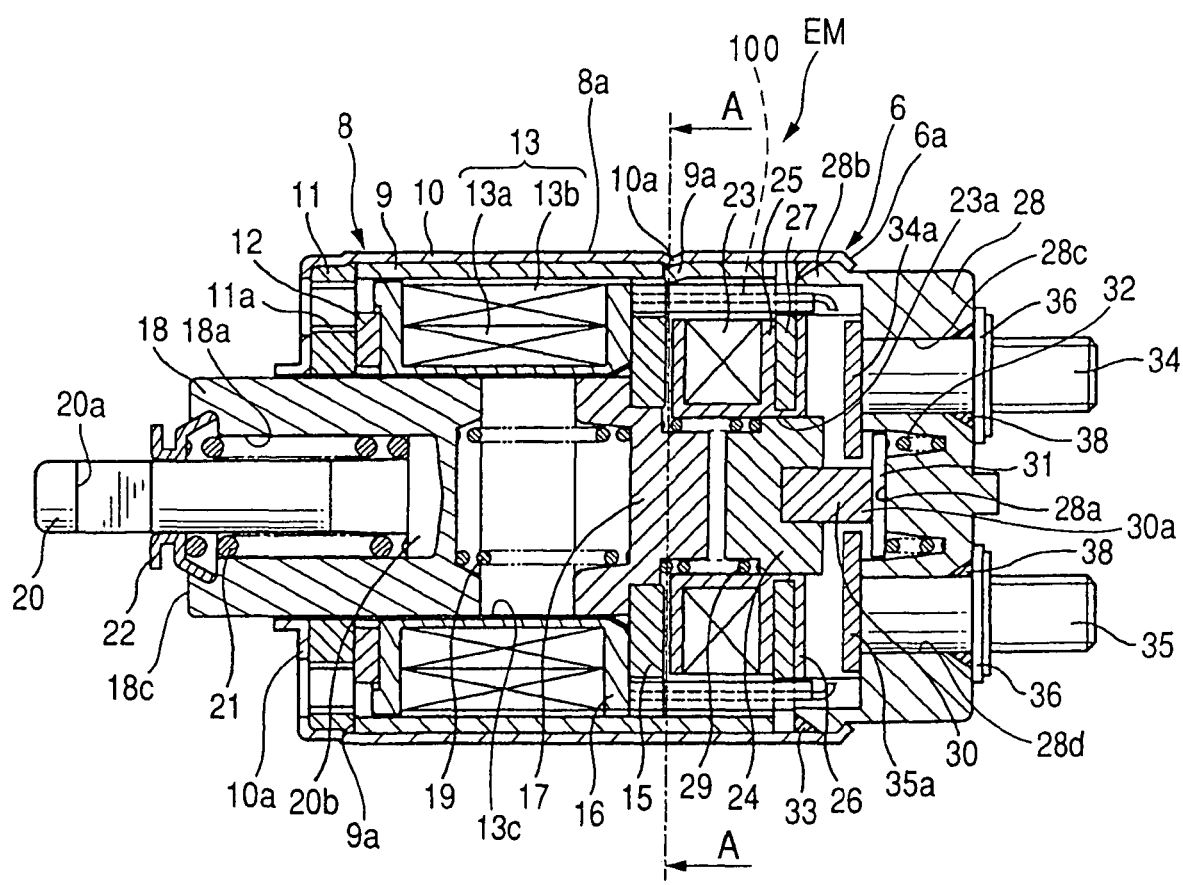
FIG. 2 is a cross sectional view showing an electromagnetic switch device installed on the starter shown in FIG. 1.
Figure 4:
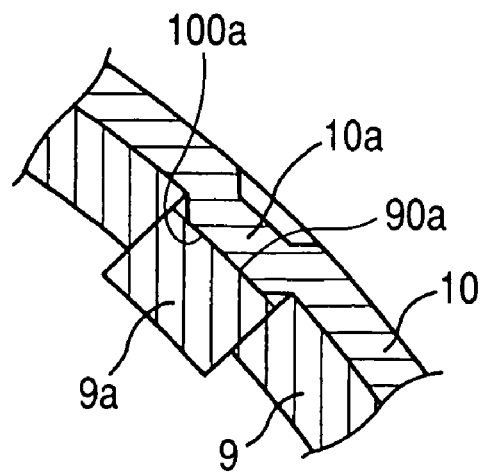
FIG. 4 is an enlarged fragmentary view showing the relationship between a cutback segment, formed on an inner yoke, and a convexed portion formed on an outer yoke.

As shown in FIGS. 2 and 4, further, the outer yoke 10 has radially inward convexed portions 10a, formed on the same axial positions and the same circumferentially spaced positions as those at which the cut-and-bent segments 9a are formed, which have inside-diameter sloped surfaces 100a held in abutting engagement with outside-diameter sloped surfaces 90a of the cut-and-bent segments 9a, respectively.

The excitation coil 13 has an inner circumferential periphery formed with a through-bore 13c to which a plunger 18 is disposed in opposition to the stationary plate 17 to be axially movable.

With the excitation coil 13 being turned on to magnetize the stationary core 17, the stationary core 17 has an attraction force with which the plunger 18 is attracted to axially move in a direction toward the axially facing motor side. In addition, if the excitation coil 13 is turned off to distinguish the attraction force, then the plunger 18 is axially pushed back toward the axially facing pinion side due to a reaction force of a return spring 19 disposed between the stationary core 17 and the plunger 18.

The plunger 18 has an axially extending hollow blind hole 18a with an axial end being opened on the axially facing pinion side to internally accommodate therein a plunger rod 20 and a drive spring 21.

The plunger rod 20 has one end, protruding from the hollow blind hole 18a on the axially facing pinion side, which is formed with a radially extending through-bore 20a operatively connected to one end of a shift lever 7 to transfer a motion of the plunger 18 to the shift lever 7.

The plunger rod 20 has one end formed with a flange portion 20b having an outer circumferential periphery held in sliding contact with an inner circumferential periphery of the hollow blind hole 18a. The drive spring 21 is placed under a compressed state storing a reaction force between the flange portion 20b of the plunger rod 20 and a lid member 22 fixedly secured to the plunger 18 at the other end 18c thereof by caulking. This allows the flange portion 20b of the plunger rod 20 to be pressed against a bottom wall of the hollow blind hole 18a.

The electromagnetic switch 6 has a switch coil 23 placed adjacent to the stationary plate 15 on the axially facing motor side. The switch coil 23 has an axially extending cylindrical bore 23a in which a plunger 24 is axially disposed in opposition to the stationary core 17 to be axially movable in sliding capability.

The switch coil 23 is wound on a bobbin 25, made of resin, which has one end integrally formed with a resin member 26 to which a second stationary plate 27 is embedded by insert molding. The second stationary plate 27 allows the bobbin 25 to be positioned with respect to the outer yoke 10.

The second stationary plate 27 takes the form of a circular metallic plate, forming a part of the magnetic circuit generated by the switch coil 23, which has a radially outward circumferential end portion clamped between an axial end face 9b, placed on the axially facing motor side, of the inner yoke 9 and a resin cover 28 to be axially fixed as will be described below in detail.

With the switch coil 23 being turned on to magnetize the stationary core 17, the plunger 24 is attracted to the stationary core 17 due to an attraction force applied from the switch coil 23 to move in a direction toward the axially facing pinion side. In contrast, if the switch coil 23 is turned off to distinguish the attraction force, then the plunger 24 is axially pushed back in a direction toward the axially facing motor side due to a reaction force of a return spring 29 interposed between the stationary core 17 and the plunger 24.

The plunger 24 has a central area on the axially facing motor side formed with a bore 24a to which one axial end of a plunger rod 30, made of resin, is fixedly mounted.

The plunger rod 30 has the other axial end 30a on the axially facing motor side to which a movable contact 31 is fixedly secured to be integrally movable with the plunger 24. The movable contact 31 rests on a contact rest surface 28a of the resin cover 28 in a pressured contact therewith, when the switch coil 23 is de-energized, and urged by a contact pressure spring 32 in a direction opposite to the contact rest surface 28a.

The resin cover 28 has one axial end 28b on the axially facing pinion side which is held in abutting engagement with one axial end face of the second stationary plate 27 at the axially facing motor side. Under such a state, the resin cover 28 is assembled to the outer yoke 10 and fixedly secured thereto on the axially facing motor side. A seal member 33, composed of, for instance, an O-ring or the like, is provided to seal the resin cover 28 and the outer yoke 10 to prevent water from intruding from the outside.

The resin cover 28 has axial bores 28c and 28d carrying therein two terminal bolts 34 and 35, respectively, which are fixedly secured to the resin cover by means of washers 36.

The two terminal bolts 34 and 35 include a B-terminal bolt 34, adapted to be connected a high voltage potential side (battery side) of a motor circuit via a battery cable, and an M-terminal bolt 35 adapted to be connected a low voltage potential side (motor side) of the motor circuit via a motor lead wire 37. The B-terminal bolt 34 and the M-terminal bolt 35 have axial ends to which stationary contacts 34a and 34b are unitarily connected, respectively, in areas inside the resin cover 28.

Connecting portions between the two terminal bolts 34 and 35 and the resin cover 28 are sealed with sealing member 38 such as, for instance, O-rings or the like to avoid water from intruding from the outside.

The main contact, mentioned above, is formed of one set of stationary contacts 34a and 35a and the movable contact 31. The movable contact 31 is brought into abutting contact with the one set of stationary contacts 34a and 35a due to the movement of the plunger 24 with the contact pressure spring 32 held in an urging state, thereby making the main contact in a closed state. With the movable contact 31 being disengaged from one set of stationary contacts 34a and 35a, the main contact is brought into an open state.

As shown in FIGS. 1 and 2, lead wires 100 of the excitation coil 13 are located in an area outside an outer circumferential periphery of the switch coil 23. Now, a wiring structure between the excitation coil 13 and the switch coil 23 will be described in detail.

Figure 5:
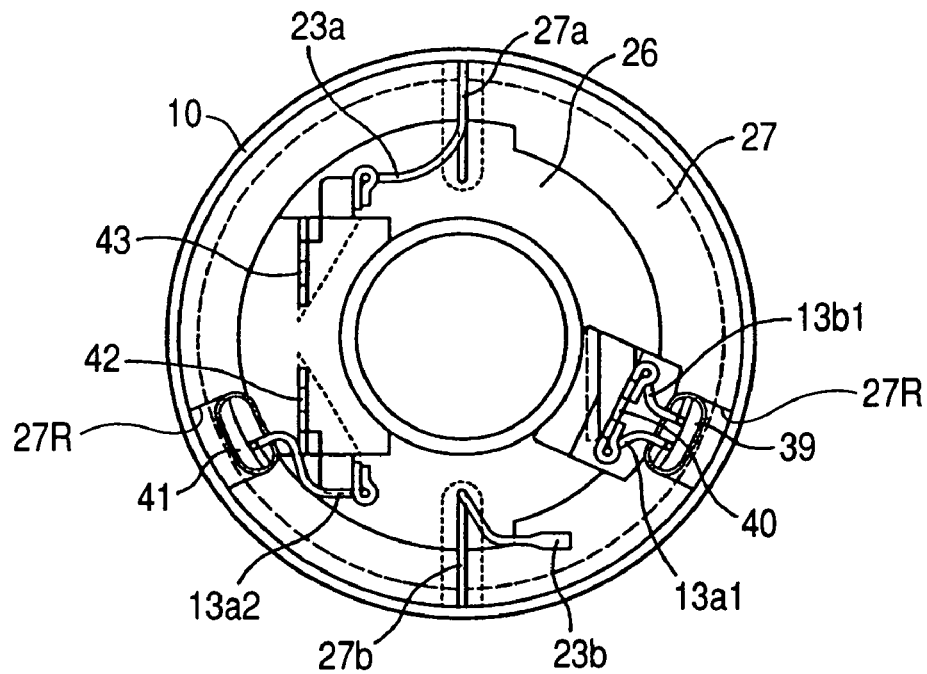
FIG. 5 is a plan view of the electromagnetic switch device as viewed in an axial direction with a resin cover being removed.

As shown in FIGS. 2 and 5, the excitation coil 13 includes an attraction coil 13a and a holding coil 13b wound on a concentric relation to one another. The attraction coil 13a and the holding coil 13b have terminal portions 13a1 and 13b1, respectively, both of which are held with a first lead-wire holder member 39. The terminal portions 13a1 and 13b1 are extracted from the second stationary plate 27 to the axially facing motor side for electrical connection to a first external connection terminal 40.

The attraction coil 13a has the other terminal portion 13a2 held with a second lead-wire holder member 41. The terminal portion 13a2 is extracted from the second stationary plate 27 to the axially facing motor side for electrical connection to a second external connection terminal 42.

The other terminal portion of the holding coil 13b is electrically connected to, for instance, to a surface of the stationary plate 15 for connection to ground.

Both of the first and second lead-wire holder members 39 and 41 are unitarily embedded in the bobbin 16 of the excitation coil 13 and extend along an outer periphery of the switch coil 23 to pass through recesses 27R formed on the second stationary plate 27 at an outer circumferential periphery thereof to reach the axially facing motor side.

As shown in FIG. 5, the switch coil 23 has one terminal portion 23a passing through one takeout recess 27a, formed on the second stationary plate 27 at one position in a radial direction, to be extracted from the second stationary plate 27 to the axially facing motor side for connection to a third external connection terminal 43. The switch coil 23 has the other terminal portion 23b passing through the other takeout recess 27a, formed on the second stationary plate 27 at the other position in a radial direction, to be extracted from the second stationary plate 27 to the axially facing motor side to be electrically connected to, for instance, the surface of the stationary plate 15 for connection to ground.

Figure 6:
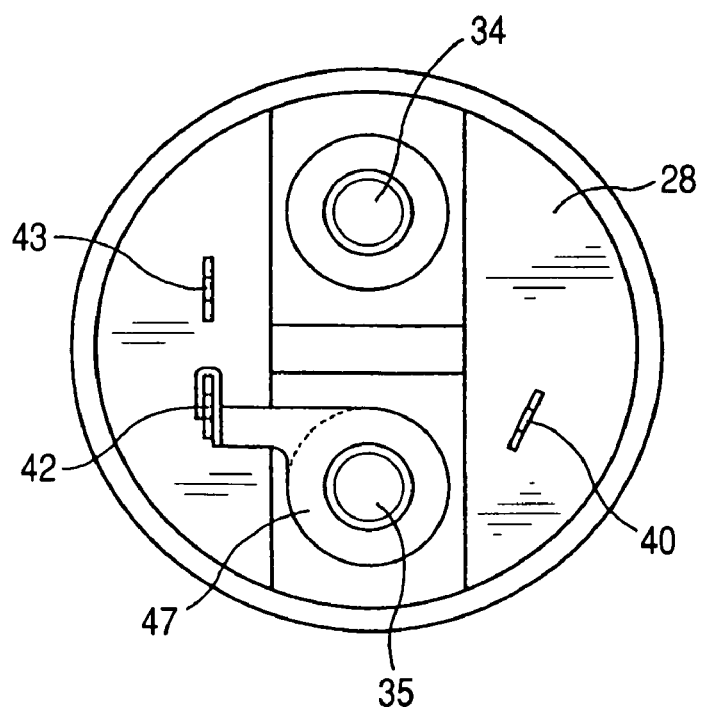
FIG. 6 is a plan view of the electromagnetic switch device as viewed from the resin cover in the axial direction.

First to third external connection terminals 40, 42 and 43 are unitarily embedded in the resin member 26 integrally formed with the bobbin 25 of the switch coil 23 to pass through the resin cover 28 such that respective end portions of the external connection terminals 40, 42 and 43 are extracted to the outside of the resin cover 28 in a manner as shown in FIG. 6.

As shown in FIG. 6, the second external connection terminal 42 is electrically connected to the M-terminal bolt 35 via a connecting metal fitting 47.

Figure 7:
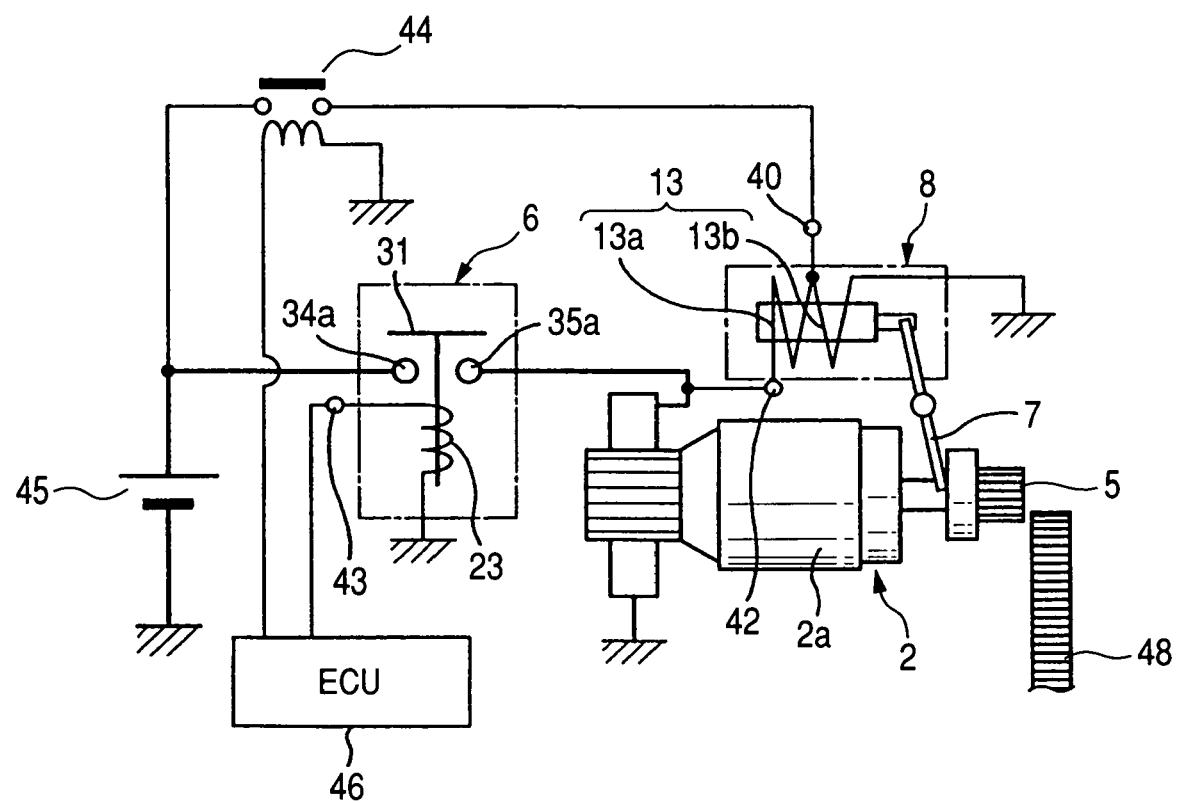
FIG. 7 is an electric circuit for the starter shown in FIG. 1.

As shown in FIG. 7, the third external connection terminal 43 is electrically connected to an ECU 46 to be turned on at given timings.

Next, the operation of the electromagnetic switch device is described below with reference to FIG. 7.

First, upon receipt of a signal delivered from the ECU 46, the starter relay 44 is turned on, thereby supplying the excitation coil 13 with electric power. As a result, the stationary core 17 attracts the plunger 18, which is consequently moved to the axially facing motor side. This causes the shift lever 7 to move the pinion gear 5 unitarily with the clutch 4 in a direction opposite to the motor, i.e., in a direction toward the ring gear of the engine.

After the pinion gear 5 is brought into abutting engagement with the ring gear 48 (see FIG. 7), the ECU 46 turns on the switch coil 23. When this takes place, the plunger 24 is caused to operate, thereby closing the main contact. This causes the battery 45 to turn on the motor 2 such that the armature 2a (see FIG. 7) generates a rotational force. This rotational force is then transferred from the armature 2a to the output shaft 3, upon which the rotational force is delivered to the pinion gear 5 via the clutch 4. As a result, if the pinion gear 5 rotates to a position in which the pinion gear can mesh with the ring gear 48, the pinion gear 5 is brought into meshing engagement with the ring gear 48 in response to a reaction force stored in the drive spring 21. This allows the rotational force to be delivered from the pinion gear 5 to the ring gear 48, thereby cranking the engine.

Advantageous Effect of the Present Embodiment

With the present embodiment, the electromagnetic switch includes the solenoid 8, having a function to push out the pinion gear 5 in a direction opposite to the motor, and the electromagnetic switch 6 for opening or closing the main contact of the motor circuit. With the excitation coil 13 being turned on, the ECU 46 turns on the switch coil 23 at a given timing, thereby enabling the pinion gear 5 and the ring gear 48 to be brought into meshing engagement under an optimum meshing condition.

With the electromagnetic switch device, further, the switch case and the solenoid case are axially contiguous in a unitary structure. Thus, no need arises to provide a specified component part with which the electromagnetic switch 6 and the solenoid 8 are coupled in an axial direction, enabling a reduction in the number of component parts and the number of processing. With the switch case and the solenoid case unified in structure, it becomes possible to obtain increased resistance to vibration exerted from the outside.

Furthermore, the stationary core 17 for the electromagnetic switch 6 and the stationary core 17 for the solenoid 8 are provided in a unitary structure, thereby obtaining a lower axial dimension than that achieved when the stationary cores 17 for both component parts are separately configured. As a result, even if the electromagnetic switch 6 and the solenoid 8 are axially placed in series, it becomes possible to decrease an overall length of both the electromagnetic switch 6 and the solenoid 8 to a minimal value. This enables the electromagnetic switch 6 and the solenoid 8 to be installed on the starter 1 without any difficulty like the electromagnetic switch of the related art. In addition, the starter 1 can be mounted on an engine at the nearly same location as that on which the related art starter is located, enabling reductions in vehicle cost and design cost.

The switch case and the solenoid case are formed in a double-layer structure and include the inner yoke 9, placed in a radially inward position, and the outer yoke 10 placed in a radially outward position. The inner yoke 9 has a cylindrical configuration with both ends formed in opened states and the outer yoke 10 is formed in a bottomed cylindrical configuration with one end formed with an annular bottom wall. With such a structure, the inner yoke 9 and the outer yoke 10 may have wall thicknesses that can be determined under a suitable relationship. Therefore, causing the outer yoke 10 to have appropriate thickness depending on, for instance, a length of the outer yoke 10 makes it possible to perform press-drawing work. This provides an increase in ratio of an overall length to diameter, enabling a reduction in processing cost.

Moreover, since the inner yoke 9 has the cylindrical configuration having the both ends formed in the open states with a resultant ease of altering the wall thickness while making it possible to adjust the wall thickness of the inner yoke 9 in order to obtain a magnetic circuit with a cross-sectional surface selected in an appropriate value. As a result, an appropriate magnetic circuit can be structured at low cost.

With the electromagnetic switch device of the present embodiment, the inner yoke 9 has the cut-and-bent segments 9a whose distal ends are brought into abutting engagement with an outer circumferential corner portion of the stationary plate 15 such that the stationary plate 15 is positioned in an axial direction. This enables the stationary core 17 to be located at an appropriate position without causing the stationary core 17, held with the stationary plate 15, to be dislocated in the axial direction.

Further, the inner yoke 9 has the wall thickness greater than that of the outer yoke 10. Therefore, even if the inner yoke 9 is formed with the cut-and-bent segments 9a, there is no risk of causing a drop in circularity precision. In addition, the positioning means for the stationary plate 15 is formed by cutback operation, thereby enabling the formation of the cut-and-bent segments 9a as the positioning means in an easy fashion even if the inner yoke 9 has an increased wall thickness.

Meanwhile, the outer yoke 10 has the convexed portions 10a, protruding radially inward at the same axial positions as those at which the cut-and-bent segments 9a are formed and the convexed portions 10a are brought into abutting engagement with the outside-diameter sloped surfaces of the cut-and-bent segments 9a. This enables the prevention of the cut-and-bent segments 9a from warping (restoring) to outside-diameter areas. This enables the stationary plate 15 to be reliably positioned without causing the stationary plate from escaping from its original location.

Further, the outer yoke 10 has a thinner wall thickness than that of the inner yoke 9, thereby enabling the convexed portions 10a to be easily formed. In addition, the outer yoke 10 is fitted to the inner yoke 9 at the outside thereof and, hence, even if the inner yoke 9 is formed with the cut-and-bent segments 9a, no risk occurs for water to intrude into clearances adjacent to the cut-and-bent segments 9a to ensure increased waterproof.

Modifications

The starter 1 of the present embodiment is of the type in which the shift lever is driven with the use of the attraction force of the excitation coil 13 incorporated in the solenoid 8 to cause the shift lever 7 to push the pinion gear 5 and the clutch 4 to the ring gear 8. However, the structure of the present invention can be applied to a so-called reduction type starter taking the form of a two-shaft structure composed of the output shaft 3 and an armature shaft of the motor 2 with a speed reduction gear being disposed between two shafts. The reduction type starter is not of the type, described with reference to the present embodiment, which uses the shift lever but of the type in which an electromagnetic switch device (inclusive of the electromagnetic switch 6 and the solenoid 6) is disposed on the same coaxial relation with the output shaft 3. This causes the output shaft 3 to be axially pushed with the use of the attraction force of the excitation coil 13 such that the pinion gear 3, carried on the output shaft 3 at an end thereof to move unitarily with the output shaft 3 to the ring gear 48.

While the specific embodiment of the present invention has been described in detail, it will be appreciated by those skilled in the art that various modifications and alternatives to those details could be developed in light of the overall teachings of the disclosure. Accordingly, the particular arrangement disclosed is meant to be illustrative only and not limited to the scope of the present invention, which is to be given the full breadth of the following claims and all equivalents thereof.

What is claimed is:

1. A starter comprising:
a motor operative to generate a rotational force;
an output shaft operative to rotate upon receipt of the rotational force of the motor;
a pinion gear slidably disposed on the output shaft to be axially movable;
an electromagnetic switch having a switch coil forming a first electromagnet to generate a first attraction force when turned on for closing a main contact disposed in a motor energizing circuit of the motor;
a solenoid having an excitation coil forming a second electromagnet to generate a second attraction force when turned on for moving the pinion gear toward a ring gear of an engine; and
a unitary structure supporting the electromagnetic switch and the solenoid in series on a coaxial relationship; wherein:
the switch coil for the electromagnetic switch has an outer diameter smaller than that of the excitation coil of the solenoid;
the unitary structure serves as a common magnetic flux path of the excitation coil and the switch coil; and
lead wires of the excitation coil are located in an area outside an outer circumferential periphery of the switch coil.

2. The starter according to claim 1, wherein:
the electromagnetic switch and the solenoid include a switch case, forming a part of a first magnetic circuit of the switch coil at an outer circumferential periphery thereof, and a solenoid case, forming a part of a second magnetic circuit of the excitation coil at an outer circumferential periphery thereof, the switch case and the solenoid case being unitarily formed to be contiguous with each other in an axial direction.

3. The starter according to claim 2, wherein:
the switch case and the solenoid case take a form of a double-layer structure including an inner yoke, placed in a radially inward area, and an outer yoke placed in a radially outward area;
the inner yoke has a cylindrical configuration with both ends being opened, and the outer yoke has a bottomed cylindrical configuration with one end formed in an annular bottom wall.

4. The starter according to claim 3, further comprising:
a stationary plate interposed between the switch coil and the excitation coil to form the parts of the magnetic circuits while holding a stationary core;
the inner yoke including a plurality of cut-and-bent segments, radially depressed inward at a position closer to the switch coil than the stationary plate and serving as positioning means, which have distal ends facing the stationary plate such that the distal ends of the cut-and-bent segments are held in abutting engagement with the stationary plate at an outer circumferential corner portion thereof to allow the stationary plate to be axially positioned; and
the outer yoke including a plurality of convexed portions, formed at the same axial positions at which the cut-and-bent segments are formed on the inner yoke, which protrude radially inward to be brought into abutting engagement with outer-diametric sloped surfaces of the cut-and-bent segments, respectively.

5. The starter according to claim 1, wherein:
the electromagnetic switch and the solenoid include a shared stationary core, magnetized with the first and second electromagnets, respectively, and movable cores placed in opposition to the shared stationary core; and
the stationary core for the electromagnetic switch and the stationary core for the solenoid being unitarily formed with each other to allow the movable core for the electromagnetic switch to be attracted in one operational direction and the movable core for the solenoid to be attracted to the stationary core in the other operational direction opposite to the one operational direction.

6. The starter according to claim 1, wherein:
the pinion gear is disposed on the output shaft unitarily with a clutch held in helical spline engagement with an outer circumferential periphery of the output shaft;
and further comprising a shift lever;
the solenoid having a function to drive the shift lever with the use of the attraction force of the excitation coil of the solenoid to push the pinion gear together with the clutch to the ring gear of the engine.

7. The starter according to claim 1, further comprising:
a starter housing having a first mounting area, on which the motor is axially mounted, and a second mounting area on which the unitary structure is axially mounted in parallel to an axis of the motor;
wherein the unitary structure allows the solenoid and the electromagnetic switch to extend in series on the coaxial relationship at a position in close proximity to an outer circumferential periphery of the motor.

8. The starter according to claim 7, wherein:
the unitary structure includes a common cylindrical casing unitarily accommodating therein the solenoid and the electromagnetic switch in the coaxial relationship;
the common cylindrical casing including an annular bottom wall fixedly mounted on the first mounting area of the starter housing.

9. The starter according to claim 7, wherein:
the common cylindrical casing includes a solenoid case and a switch case both of which axially extend in a continuous manner to be unitarily formed;
the common cylindrical casing comprising an outer yoke commonly for the solenoid and the electromagnetic switch.

10. The starter according to claim 9, further comprising:
an inner yoke disposed inside the common cylindrical casing commonly for the solenoid and the electromagnetic switch.

11. The starter according to claim 10, further comprising:
a stationary plate disposed inside the inner yoke at a position between the solenoid and the electromagnetic switch to act as a part of a common magnetic circuit for the solenoid and the electromagnetic switch and having an outer periphery in contact with an inner periphery of the inner yoke;
wherein the inner yoke has a circumferential wall formed with a plurality of cut-and bent segments radially protruding inward to retain the stationary plate against one axial end of the excitation coil of the solenoid.

12. The starter according to claim 11, further comprising:
an annular member placed inside the common cylindrical casing at the annular bottom wall thereof to face the other axial end of the excitation coil of the solenoid;
the annular member having a plurality of threaded portions to be fixedly connected to the second mounting area of the starter housing to fixedly mount the common cylindrical casing thereon.

13. The starter according to claim 12, further comprising:
a resilient member placed between the annular member and the other axial end of the excitation coil of the solenoid to urge the excitation coil against the stationary plate to prevent the excitation coil from axially moving due to vibrations applied from external sources.

14. The starter according to claim 12, wherein:
the annular member has one end held in contact with the annular bottom wall of the common cylindrical casing and a distal end of the inner yoke;
the annular member having an outer circumferential periphery in contact with an inner periphery of the common cylindrical casing to act as a part of a magnetic circuit of the excitation coil of the solenoid.

* * * * *

UNITED STATES PATENT AND TRADEMARK OFFICE
CERTIFICATE OF CORRECTION

| | | |
|---|---|---|
| PATENT NO. | : 8,307,726 B2 | Page 1 of 1 |
| APPLICATION NO. | : 12/320100 | |
| DATED | : November 13, 2012 | |
| INVENTOR(S) | : Niimi | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 762 days.

Signed and Sealed this
Second Day of September, 2014

Michelle K. Lee
*Deputy Director of the United States Patent and Trademark Office*